Nov. 8, 1932.　　　C. L. KENNEDY　　　1,887,267
CENTRIFUGAL SWITCH FOR MOTORS
Filed June 3, 1931
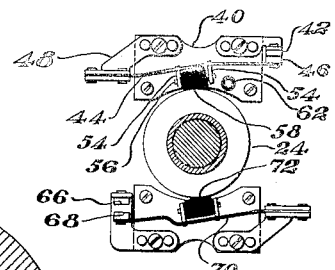
Fig.4
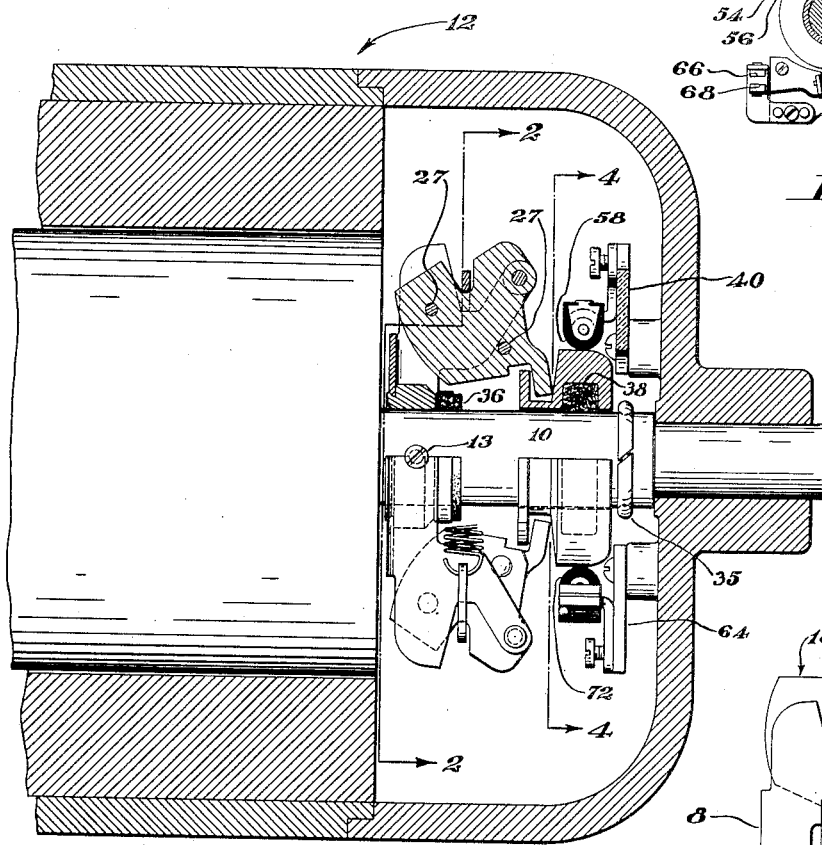
Fig.1
Fig.2
Fig.3
Fig.5
Witness
Paul F. Bryant
Inventor
Carlton L. Kennedy
by his attorneys
Van Everen, Fish, Hildreth & Cary Patented Nov. 8, 1932

1,887,267

UNITED STATES PATENT OFFICE

CARLTON E. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS

CENTRIFUGAL SWITCH FOR MOTORS

Application filed June 8, 1931. Serial No. 541,808.

The present invention relates to centrifugal switches for motors.

The principal object of the present invention is to provide a simple, durable and inexpensive centrifugal switch which is positive in operation and which permits convenient variation of the operating speed.

Another object of the invention is to provide a centrifugal switch in which no rotating parts are required to carry current.

With these and other objects in view, as will hereinafter appear, the present invention consists of the centrifugal switch hereinafter described and particularly defined in the claims.

In the accompanying drawing, Fig. 1 is a sectional elevation of a motor embodying the preferred form of switch; Fig. 2 is a section on line 2—2 of Fig. 1; Fig. 3 is an elevation of the moving parts in running position; Fig. 4 is a section on line 4—4 of Fig. 1, showing the switch assemblies; and Fig. 5 is a view showing the switches in different positions.

The illustrated embodiment of the invention comprises a pressed metal frame 8 secured to the shaft 10 of the motor 12 by a set screw 13. The frame is formed with sides 14 having outwardly extending wings 16. Between each pair of wings on opposite sides of the frame is pivoted a weight indicated generally at 18. In the construction shown, there are two weights, disposed on opposite sides of the shaft. The weights are freely pivoted on pins 20 connected between opposed wings.

Each weight is provided with an inwardly projecting tail portion 22 to engage a sliding collar 24. Each weight is preferably made up of a plurality of stamped laminations, all of the same shape, except that the tail portion 22 may be formed only on the central laminations. The laminated structure is desirable for several reasons. In the first place, it permits economical manufacture of the weights of any desired material, for example, of lead for low speed motors, of steel for intermediate speed motors, and of fiber or resin condensates for high speed motors. No molding or machining operations are required. Furthermore, it permits a composite structure, for example, using a number of plates of lead for weight, and a few interspersed plates of steel to resist wear. A composite structure is shown in Fig. 2, having a majority of lead laminations 25 with three steel laminations 26. The laminations, of whatever material or materials they may be made, are secured together by rivets 27 to form the completed weight.

The outer surface of each weight is slotted, as shown at 28, to receive an arm or yoke 29. The two arms are connected at opposite sides of the frame by tension springs 30 which are connected only to the ends of the arms. The ends of the springs are looped into holes 31 near the ends of the arms. An alternative set of holes 32, spaced slightly farther apart, permits compensation for variations in the springs or weights. The two arms and the two springs make a unitary detachable assembly, thus permitting easy replacement with springs of varying strengths, whenever desired. The arms normally rest in recesses 33 in the frame when the motor is stationary. In operation, when a critical speed is reached, the weights are thrown outwardly about their pivots against the tension of the springs. The critical speed depends on the size and composition of the weights and their distance from the axis, as well as on the strength of the springs. The desired critical speed at which the weights are to operate for any motor may be varied by alteration of any of these factors. Inasmuch as the centrifugal forces acting on the weights vary as the square of the speed, the weights act rapidly against the spring tension when the critical speed is reached.

The collar 24 which is movable axially of the shaft, has an annular groove 34 within which extend the projections 22 of the weights. The collar is limited in its outward axial movement by a spring ring 35 received in a groove in the shaft, in order that the center of gravity of each weight is always maintained inside the pivot (i. e., at the left of the pivot, as viewed in Fig. 1) so that the weights are always required to swing outwardly on the correct side of their pivots. Upon reaching the critical speed, the collar is moved inwardly from its initial position to a position where it engages a soft felt or rubber washer 36 secured in the frame. So long as the motor operates at running speed, the collar, being firmly gripped by the weights and frictionally engaged by the washer, rotates with the frame, there being no relative movement between the collar and the weights. The collar may be lubricated by a wick 38 laid in an internal groove of the collar. Upon stopping of the motor, the collar and the weights are restored to their initial positions by the springs 30.

The axial motion of the collar may be utilized in any desired manner. As herein shown, the collar controls one or more stationary switch mechanisms. Two switch assemblies are shown, one for opening a circuit and the other for closing a circuit as the motor comes up to speed. The first switch assembly comprises an insulating base 40 attached to the end cap of the motor. The base carries a fixed contact 42 and a movable contact arm 44 which has a contact 46 at the end. The arm 44 is a spring arm attached to a bracket 48 on the base. Suitable leads may be connected with the contacts. Extending from the arm 44 are a pair of small brackets 54 carrying a pin 56, to which a small roller 58 of insulating material is attached. The outer surface of the collar 24 is rounded, as indicated at 60, to form a cam. When the motor is idle, the collar supports the roller 58 to hold the contacts 42 and 46 in engagement, as shown in Fig. 4, but when the collar is moved axially, the roller drops off the cam surface, permitting the spring contact arm to move away from the fixed contact, as shown in Fig. 5. The motion of the arm is transverse to the motion of the collar. Overthrowing or vibration of the contact arm upon opening movement is prevented by a stop 62 of insulating material, projecting outwardly from the base. This type of switch may be used in the usual split-phase motor, in which a split-phase winding is left in circuit only at starting and is cut out of circuit as the motor approaches running speed.

The type of switch which acts to close a circuit upon reaching a critical speed is in general similar to the switch described above, in that it has a base 64 attached to the end cap, a fixed contact 66, and a movable contact 68, the latter mounted on a spring arm 70, which has a roller 72 acting as a cam follower. The contacts are reversed, with respect to the contacts of the other switch. Idle or open position is shown in Fig. 4 and running or closed position in Fig. 5. This type of switch is useful in some forms of condenser induction motors. Although a switch of each type is herein shown and described, the motor may employ one or more switches of either or both types, depending on the construction and operation of the motor itself.

It will be seen that the present invention comprises a centrifugal switch assembly in which no rotating part is required to carry current, the rotating and sliding parts serving only to actuate the stationary switches. This not only results in sudden and positive making or breaking of the circuit, but also permits convenient replacement of the contacts without dismantling any of the moving parts. The construction is also particularly advantageous in that it is adapted for a wide range of critical speeds. A simple change of springs only may be used for induction motors of several operating speeds, while a change of springs, collars and weights, without a change in size, covers the full range of speeds ordinarily met with in stock motors. For very low speed motors, it may be desirable to increase the size of the frame, to pivot the weights at a greater distance from the axis, a change which can be made without the necessity of altering the size or shape of the weights.

Since the switch contacts are operated laterally of the collar, they are in no way affected by the end play of the rotor, and no special precautions with regard to accuracy of assembly are necessary, as is the case with some types of longitudinally operable contacts. Moreover, the switches do not produce any end thrust, and do not interfere with the movement of the collar; in fact, at starting, the final movement of the collar is facilitated at the instant of operation of the switches by the pressure of the switch rollers against the curved outer cam edge 60 of the collar, thus contributing to the quick opening or closing of the contacts when the critical speed is reached.

Durability and quiet operation are assured because there is no relative movement between any parts when the motor is running. At starting or stopping, the collar is held against rotation by the switch rollers, so that the wear on the rollers is very slight, although some relative rotation between the weights and the collar occurs. However, the period during which relative movement may occur between any of the parts is small, and after the motor comes up to speed, the rotating parts all move as a single unit, without any connection whatever with the switch members.

Having thus described the invention, what is claimed is:

1. A centrifugal switch mechanism for a motor having, in combination, a rotatable frame, and weights carried by the frame, each comprising a plurality of laminations of dissimilar materials including some laminations of wear resisting material.

2. A centrifugal switch mechanism for a motor having, in combination, a rotatable frame, opposed weights carried by the frame and movable outwardly upon rotation of the frame, the weights having notches, detachable arms received in notches of the separate weights, and springs connecting the arms.

3. A centrifugal switch mechanism for a motor having, in combination, a rotatable frame, weights carried by the frame and movable outwardly upon rotation of the frame, a collar engaged by the weights and movable axially, a stationary switch having a movable contact supported by the collar when the frame is stationary, and means for resisting rotation of the collar during starting and stopping and permitting rotation thereof with the frame under running conditions.

4. A centrifugal switch mechanism for a motor having, in combination, a rotatable frame, weights carried by the frame and movable outwardly upon rotation of the frame, an axially movable cam engaged by the weights, a stationary switch having a fixed contact, and a laterally movable contact supported by the cam when the frame is stationary and disengaged from the cam upon movement thereof.

5. A centrifugal switch mechanism for a motor having, in combination, a rotatable frame, weights carried by the frame and movable outwardly upon rotation of the frame, an axially movable cam engaged by the weights, a stationary switch having a fixed contact and a laterally movable contact, the laterally movable contact being supported out of engagement with the fixed contact by the cam when the frame is stationary, and movable into engagement with the fixed contact upon axial movement of the cam.

6. A centrifugal switch mechanism for a motor having, in combination, a rotatable frame, weights carried by the frame and movable outwardly upon rotation of the frame, an axially movable cam engaged by the weights, a stationary switch having a fixed contact and a laterally movable contact, the laterally movable contact being supported in engagement with the fixed contact by the cam when the frame is stationary, and movable out of engagement with the fixed contact upon axial movement of the cam.

7. A centrifugal switch mechanism for a motor having, in combination, a rotatable frame, weights carried by the frame and movable outwardly upon rotation of the frame, an axially movable cam engaged by the weights, a stationary switch having a fixed contact and a laterally movable contact, the laterally movable contact being supported in engagement with the fixed contact by the cam when the frame is stationary, and movable out of engagement with the fixed contact upon axial movement of the cam, and a stop for limiting the travel of the movable contact.

8. A centrifugal switch mechanism for a motor having, in combination, a rotatable frame, weights carried by the frame and movable outwardly upon rotation of the frame, an axially movable cam engaged by the weights, a stationary switch having a fixed contact and a laterally movable contact, and a roller carried by the movable contact and engaged by the cam when the frame is stationary and adapted to be disengaged from the cam when the frame is rotating.

9. A centrifugal switch mechanism for a motor having, in combination, a rotatable frame, weights carried by the frame, a member movable axially by the weights, switch contacts, and means for operating the contacts by the axially movable member, the switch contacts acting at the instant of operation thereof to press the axially movable member in the direction of its movement.

10. A centrifugal switch mechanism for a motor having, in combination, a rotatable frame, weights carried by the frame, a member movable axially by the weights, and a switch having a spring contact pressing laterally on the axially movable member, the axially movable member being disengaged from the contact when the frame rotates.

11. A centrifugal switch mechanism for a motor having, in combination, a rotatable frame, weights carried by the frame, a member movable axially by the weights, and a switch having a spring contact pressing laterally on the axially movable member when the frame is stationery, the axially movable member having a curved cam surface to permit lateral movement of the contact and to facilitate axial movement of the member out of engagement with the contact.

12. A centrifugal switch mechanism for a motor having, in combination, a rotatable frame, weights carried by the frame, a collar movable axially by the weights and having a cam surface, and a plurality of stationary switches, each having a movable contact supported by the collar in inactive position and laterally movable upon axial movement of the collar.

In testimony whereof I have signed my name to this specification.

CARLTON L. KENNEDY.